United States Patent [19]

Tsao

[11] 4,303,927

[45] Dec. 1, 1981

[54] APPARATUS FOR EXCITING AN ARRAY OF INK JET NOZZLES AND METHOD OF FORMING

[75] Inventor: Sherman H. Tsao, Boulder, Colo.

[73] Assignee: International Business Machines Corporation, Armonk, N.Y.

[21] Appl. No.: 780,572

[22] Filed: Mar. 23, 1977

[51] Int. Cl.[3] .......... G01D 15/18

[52] U.S. Cl. .......... 346/75; 346/140 R

[58] Field of Search .......... 346/75, 140

[56] References Cited

U.S. PATENT DOCUMENTS

| | | | |
|---|---|---|---|
| 3,373,437 | 3/1968 | Sweet | 346/75 |
| 3,586,907 | 6/1971 | Beam | 346/75 X |
| 3,667,678 | 6/1972 | Haskell | 346/140 X |
| 3,701,476 | 10/1972 | Houser | 346/75 X |
| 3,739,393 | 6/1973 | Lyon | 346/75 X |
| 3,868,698 | 2/1975 | Dressler | 346/75 |
| 3,900,162 | 8/1975 | Titus | 346/75 X |
| 3,927,410 | 12/1975 | Pimbley | 346/75 X |
| 3,955,203 | 5/1976 | Chocholaty | 346/75 |
| 3,958,255 | 5/1976 | Chiou | 346/75 X |
| 4,007,464 | 2/1977 | Bassous | 346/75 |
| 4,032,928 | 6/1977 | White | 346/75 X |
| 4,068,144 | 1/1978 | Toye | 346/75 X |
| 4,153,901 | 5/1979 | White | 346/75 |

OTHER PUBLICATIONS

Krause, K. A.; "Focusing Ink Jet Head; IBM Tech. Disc. Bulletin, vol. 16, No. 4, Sep. 1973 p 1168.

Fowler, R. L.; Ink Jet Copier Nozzle Array; IBM Tech. Disc. Bulletin, Vol. 16, No. 4, Sep. 1973 pp. 1251-1253.

*Primary Examiner*—Joseph W. Hartary

*Attorney, Agent, or Firm*—Frank C. Leach, Jr.; Homer L. Knearl

[57] ABSTRACT

A piezoelectric transducer forms a wall of an ink cavity, which has a linear array of ink jet nozzles communicating therewith. The piezoelectric transducer is preferably an arcuate sector of a cylinder having an angle no greater than 180° with its mean radius, wall thickness, and its arcuate angle selected so that the arcuate sector vibrates only in a selected symmetrical mode at a selected resonant frequency when a voltage is applied at that frequency. The length of the transducer is chosen to be longer than the length of the linear array of nozzles so that the periodic pressure waves produced in the ink cavity by the transducer vibrating at the selected resonant frequency will have substantially the same amplitude at the entrance of each of the nozzles to form droplets of substantially uniform size and at substantially the same break-off point. The applied voltage selected is that which is necessary to produce uniformly satellite free droplets from the array of ink streams.

61 Claims, 11 Drawing Figures

APPARATUS FOR EXCITING AN ARRAY OF INK JET NOZZLES AND METHOD OF FORMING

When a plurality of ink jet nozzles is connected to an ink cavity, it is desired that the droplets produced from the streams passing through each of the nozzles have substantially the same break-off point, be substantially uniform in size, have substantially uniform spacing between the droplets, and be satellite free. This insures that the quality of the print from each of the nozzles will be substantially the same.

To obtain this uniformity between the droplets of the various streams, it is necessary that the perturbations applied to each of the ink streams of the nozzles be substantially uniform and that the nozzles be of uniform quality. Furthermore, for the production of the droplets to be satellite free, it is necessary that the perturbations be sufficiently large. It also is necessary for the perturbations to not only be substantially uniform but to be reproducible throughout the time that the droplets are being produced.

To meet these basic requirements, it is necessary that the transducer or driver, which produces the vibrations for causing the perturbations in the ink streams, be capable of operation so that the amplitude of each of the pressure waves produced in the ink cavity by the driver is substantially the same at the entrance to each of the ink jet nozzles. This will produce uniform perturbations in the ink jet streams flowing through the nozzles. It also is necessary for the amplitude of the pressure waves to be sufficiently high to produce satellite free droplets.

With respect to the intended orientation of the various components in the total structure, it should be understood that the length dimension of both the transducer and the ink cavity is parallel to a line connecting the entrances of the nozzles of the array. Thus, the required transducer vibration mode which produces uniform perturbations for the array of ink jet streams is that in which the vibrations are in phase along the length direction of the transducer and that the amplitudes are uniform for a sufficient portion of the transducer length about which the nozzle array is in alignment. For simplicity, this particular vibration mode shall be referred to as the symmetrical mode.

While the foregoing describes what is necessary to produce uniform perturbations for the array of ink jet streams, the non-uniformity of the perturbations in the ink streams is due to both non-symmetrical driver vibrations and end conditions. Non-symmetrical driver vibrations are those which are not in phase along the length direction and/or are non-uniform in amplitude. When using a piezoelectric transducer as the driver, for example, both symmetrical and non-symmetrical vibration modes may happen at the same resonant frequency.

One cause of the end conditions is due to the end walls of the ink cavity acting on the ink as the pressure wave moves through the ink in the ink cavity. This diminishes the amplitude of the pressure wave adjacent each end wall of the ink cavity.

Furthermore, the vibrations produced in a piezoelectric transducer tend to be slightly non-uniform at the free ends even though the electrical signal is at the correct resonant frequency. Since these free ends of the transducer are adjacent the end walls of the ink cavity, this non-uniformity of the vibrations has a further effect on preventing the amplitude of the pressure wave at the ends of the ink cavity from being substantially the same amplitude elsewhere.

Thus, to obtain uniformity of ink stream perturbations, both the non-symmetrical driver vibrations and the end conditions must be removed or avoided. The present invention satisfactorily meets these foregoing conditions through providing a symmetrical driver vibration over a substantial length of the piezoelectric transducer and disposing the linear array of nozzles in alignment with the portion of the length of the driver in which the pressure waves produced from the driver arrive at each of the ink jet nozzles with substantially the same amplitude. By mounting the linear array of the nozzles in alignment with this portion of the length of the driver, the end conditions also are avoided.

To obtain a symmetrical driver vibration along a significant length of a piezoelectric transducer, the geometry of the transducer must be selected so that it will vibrate only in a selected symmetrical mode at a selected resonant frequency when a voltage of the selected resonant frequency is applied thereto. The geometry also must be selected so that the frequencies of any other vibration modes are sufficiently above or below this resonant frequency so as to not be produced when the voltage is applied at the selected resonant frequency. Thus, by selecting the geometry of the transducer, the present invention produces a symmetrical vibration along a substantial length thereof.

Because of the end conditions, the pressure waves produced by the transducer of the present invention will not have the same amplitude adjacent each end of the ink cavity. Accordingly, the linear array of nozzles is disposed in alignment with the portion of the ink cavity in which the amplitudes of the pressure waves from the transducer are substantially uniform at the entrance to each of the nozzles.

The present invention preferably employs an arcuate sector of a cylinder as the geometry for the transducer. By controlling the mean radius, the wall thickness, and the arcuate angle of the arcuate sector, only symmetrical vibration modes of a specific resonant frequency are produced by the piezoelectric transducer when subjected to a voltage of the specific resonant frequency.

The arcuate sector, which forms the transducer, can almost be a straight slab or element when the mean radius of the transducer is very large and the arcuate angle is very small. Thus, the arcuate sector, which is employed as the transducer in the present invention, does not have to have a large curve.

Furthermore, it is not necessary for the piezoelectric transducer to be an arcuate sector of a cylinder. Instead, an element of rectangular shaped cross section can be employed as the transducer. It is only necessary that the geometry of the piezoelectric transducer be selected so that the application of a voltage to the transducer at a selected resonant frequency causes vibrations of the transducer only at the selected resonant frequency and that these vibrations are symmetrical.

In selecting the geometry of the transducer, the frequency at which it is desired for the droplets to be produced from the array of ink jets is determined. Then, the relationship of this desired frequency to the resonant frequency of an arcuate sector which is free and not restrained must be obtained. The reason for this difference in frequency between the resonant frequency of a free arcuate sector and an arcuate sector used with an ink cavity is because of the constraint of the elastic foundation in which the transducer is mounted and any gasket employed between the transducer and the mounting plate for the ink jet nozzles. Another factor affecting the relation of the frequency of a free arcuate sector and an arcuate sector used with an ink cavity is the loading of the ink from the side of the arcuate sector facing the cavity.

When the frequency at which the free arcuate sector would resonate to produce the desired frequency of droplet generation from the array of ink jets is obtained, then the geometry of the arcuate sector is determined. Thus, the mean radius, the wall thickness, and the arcuate angle of the arcuate sector are selected together to produce the necessary resonant frequency.

If the piezoelectric transducer is a rectangular shaped element rather than an arcuate sector of a cylinder, the same relationship of the desired frequency of the droplets to the resonant frequency of the transducer must be obtained. Thus, irrespective of its configuration, the piezoelectric transducer must be capable of vibrating only in a selected symmetrical mode at a selected resonant frequency when a voltage is applied to the transducer at the selected resonant frequency.

As the length of the arcuate sector decreases, the undesired vibrations in the arcuate sector occur at high frequencies. Accordingly, if the piezoelectric transducer is formed of a plurality of arcuate segments of relatively short length, then all of the undesired vibrations occur at frequencies above the resonant frequency because of the relatively short length of each arcuate segment. This also is applicable to a transducer formed as a flat or rectangular shaped element.

One embodiment of the present invention forms the arcuate sector of a plurality of segments connected to each other. As one example, the arcuate sector could be one continuous piece with slots cut in its periphery at equal intervals to form segments so that a common central core connects the segments to each other. As another example, separate short segments of arcuate sectors could be formed and joined together by a suitable epoxy whereby the vibrations between the segments would only be weakly coupled.

With the present invention, the piezoelectric transducer preferably forms a wall of the ink cavity. However, the ink cavity could have a wall formed by a very thin member rather than by the transducer with the transducer in contact with the very thin member. It is necessary that the member which forms the wall and has the transducer in contact therewith be very thin because the mass of the member must be small relative to the mass of the transducer. If the member forming the wall of the cavity is too thick so as to have too large a mass relative to the transducer, the motions of the transducer would be modified so that the droplets would not be produced at the desired frequency.

While pages 1251-1253 of Volume 16, No. 4 (September 1973) issue of the IBM Technical Disclosure Bulletin disclose the use of a piezoelectric transducer of a semi-cylindrical shape as a wall of an ink cavity, there is no recognition of the problem of the resonant frequency and its solution. The aforesaid IBM Technical Disclosure Bulletin also does not recognize the concept of the present invention in which the arcuate sector of the piezoelectric transducer can have an arcuate angle less than 180° with its arcuate angle, its wall thickness, and its mean radius selected to produce a desired resonant frequency. There also is no recognition by the aforesaid IBM Technical Disclosure Bulletin that the transducer could be a flat or rectangular shaped element.

An object of this invention is to obtain uniform perturbations of a plurality of ink streams in an array of ink jet nozzles by a piezoelectric element vibrating only in a selected symmetrical mode at a selected resonant frequency.

Another object of this invention is to simultaneously produce substantially uniform droplets from each of a plurality of ink streams at substantially the same break-off point by a piezoelectric element vibrating only in a selected symmetrical mode at a selected resonant frequency.

A further object of this invention is to produce satellite free droplets from each of a plurality of ink streams at a desired frequency by a piezoelectric element vibrating only in a selected symmetrical mode at a selected resonant frequency.

Still another object of this invention is to provide a method for forming an apparatus for simultaneously exciting a plurality of ink streams in a linear array of ink jet nozzles to obtain uniform perturbations in the ink streams by a piezoelectric element vibrating only in a selected symmetrical mode at a selected resonant frequency.

The foregoing and other objects, features, and advantages of the invention will be apparent from the following more particular description of preferred embodiments of the invention as illustrated in the accompanying drawings.

Figure 2:
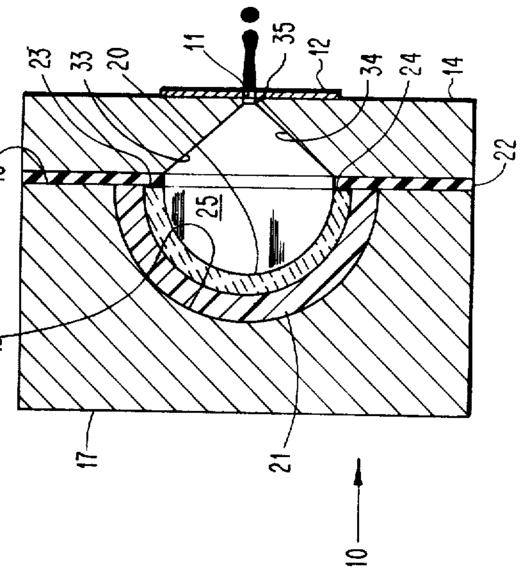
FIG. 2 is a sectional view of the apparatus of FIG. 1 and taken along line 2—2 of FIG. 1.
Figure 1:
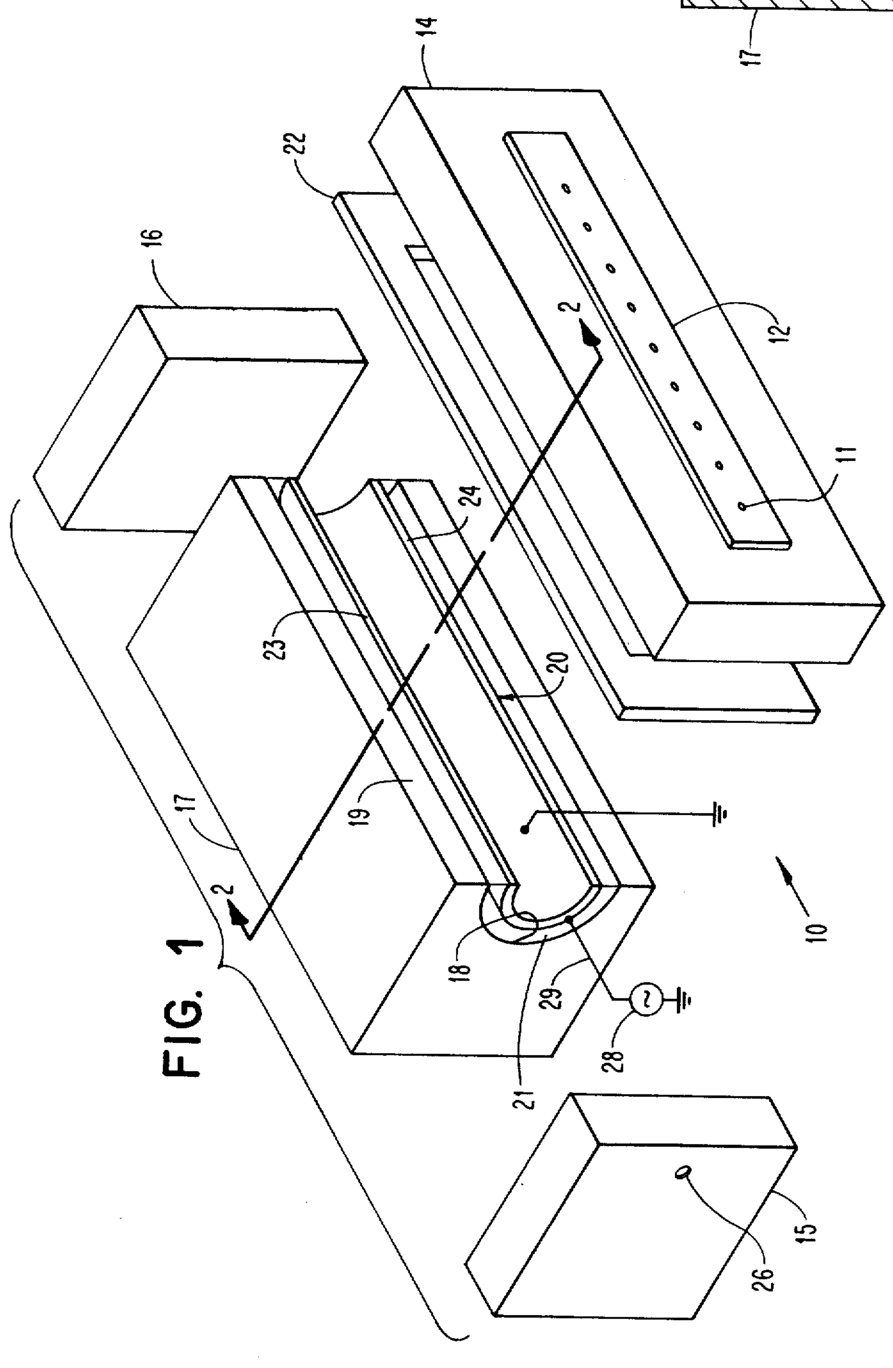
FIG. 1 is an exploded perspective view of one form of the apparatus of the present invention.

Referring to the drawings and particularly FIGS. 1 and 2, there is shown an ink jet head 10 having a plurality of equally spaced nozzles 11 arranged in a linear array in a plate 12. The plate 12 is supported on a mounting plate 14.

The ink jet head 10 includes a pair of end walls or caps 15 and 16, which are supported by a housing 17. It should be understood that the end caps 15 and 16 and the housing 17 could be integral, if desired. The housing 17 has an arcuate slot 18 formed along the entire length of a wall 19, which faces the mounting plate 14 when the ink jet head 10 is assembled.

An arcuate sector 20 of a piezoelectric material is disposed within the arcuate slot 18. While the arcuate sector 20 has been shown as extending for 180°, it should be understood that this is just one of infinitely many arcuate angles possible of the arcuate sector 20 and that the arcuate angle, the mean radius, and the wall thickness of the arcuate sector 20 depend on the desired resonant frequency at which the ink droplets are to be generated by the ink jet head 10.

The arcuate sector 20 is retained within the arcuate slot 18, which has the same arcuate angle as the arcuate sector 20, by an elastic foundation 21 such as an epoxy, for example. The layer of epoxy is of high accoustical impedance, and it isolates the vibrations of the arcuate sector 20 from the housing 17.

While the epoxy is shown as being disposed for the entire length of the arcuate slot 18, it should be understood that such is not necessary for satisfactory operation although it is preferred. It is only necessary that the epoxy be disposed at each end of the arcuate sector 20 within the arcuate slot 18 so as to isolate the arcuate sector 20 from the housing 17.

A gasket 22 is disposed between the mounting plate 14 and the wall 19 of the housing 17 and between the mounting plate 14 and an abutting surface of each of the end walls 15 and 16. The gasket 22 also bears against free lateral surfaces 23 and 24 of the arcuate sector 20 so that they cannot contact the mounting plate 14. Because of this, the gasket 22 affects the resonant frequency of the arcuate sector 20.

The thickness of the gasket 22 is used to change the resonant frequency of the arcuate sector 20. As the thickness of the gasket 22 is decreased, the resonant frequency of the arcuate sector 20 is increased. Thus, the thickness of the gasket 22 is selected to fine tune the resonant frequency of the arcuate sector 20.

When the arcuate sector 20 has a fixed arcuate angle such as a half cylinder as shown in FIG. 1, the resonant frequency of the arcuate sector 20 can be altered by changing the mean radius or the wall thickness of the arcuate sector 20. However, since the arcuate sector 20 may have any arcuate angle but preferably no greater than 180°, the arcuate angle also can be changed to vary the resonant frequency if the arcuate angle is not fixed. Likewise, as previously mentioned, the thickness of the gasket 22 fine tunes the resonant frequency to that desired.

The arcuate sector 20, the nozzle mounting plate 14, the gasket 22, and the end walls 15 and 16 cooperate to form an ink cavity 25 therebetween. Each of the end walls 15 and 16 extends for the width and thickness of the housing 17.

Ink is supplied under pressure from a reservoir (not shown) to the ink cavity 25 through a passage 26 in the end wall 15. The ink cavity 25 is completely filled with ink under pressure although the ink is not shown in the ink cavity 25 in FIG. 2 for clarity purposes.

One side of an AC source 28 is connected by a line 29 to one side of the arcuate sector 20 while the other side of the AC source 28 is grounded. The inside surface of the arcuate sector 20 is held at ground potential with the conductive ink serving as the electrical connection. Accordingly, by the AC source 28 applying a voltage at the selected resonant frequency, the vibrations produced in the ink cavity 25 have a substantially uniform amplitude at the entrance to each of the nozzles 11 of the linear array. Accordingly, the droplets formed from the ink streams passing through the nozzles 11 will be of substantially uniform size with substantially uniform spacing and have substantially the same break-off point after their exits from the nozzles 11.

It is necessary to control the voltage for the selected resonant frequency in order for the droplets of the ink streams to be free of satellites. The magnitude of the voltage is selected so that it is large enough to cause the driver force from the arcuate sector 20 to create sufficient amplitude of the pressure waves within the ink cavity 25 so that the droplets produced from the ink streams flowing through the nozzles 11 are satellite free.

As shown in FIG. 2, the mounting plate 14 has inclined walls or surfaces 33 and 34 on opposite sides of a longitudinal opening 35, which communicates with all of the nozzles 11 in the plate 12. Thus, the inclined walls or surfaces 33 and 34 are on the opposite sides of a line connecting the axes of the nozzles 11.

The inclined walls 33 and 34 of the mounting plate 14 serve to focus the pressure waves in the ink cavity 25 into the longitudinal opening 35. Instead of the opening 35 being a single longitudinal opening with which all of the nozzles 11 communicate, a plurality of openings could be formed in the mounting plate 14 rather than the single longitudinal opening 35 with each of the openings in the mounting plate 14 being aligned with one of the nozzles 11 in the plate 12.

Considering the formation and operation of the apparatus of FIGS. 1 and 2, the desired frequency at which the droplets are to be formed from the ink streams flowing through the nozzles 11 is first determined. When this frequency has been obtained, then the frequency at which it is necessary for the arcuate sector 20 by itself to vibrate to produce this desired frequency of droplet production is determined. This depends upon the thickness of the gasket 22 and the thickness of the epoxy forming the elastic foundation 21. With this desired frequency of the arcuate sector 20 being determined, the arcuate angle, the mean radius, and the wall thickness of the arcuate sector 20 are then selected to produce this resonant frequency. The arcuate angle, the mean radius, and the wall thickness of the arcuate sector 20 are selected so that the arcuate sector 20 will vibrate at the selected resonant frequency only with symmetrical vibrations of the selected mode when the voltage is applied from the AC source 28 to the arcuate sector 20 at that selected resonant frequency.

After the geometry of the arcuate sector 20 has been determined, then the necessary voltage from the AC source 28 to produce satellite free droplets is determined. This can be done only by testing the apparatus after it has been assembled.

After the satellite free voltage has been determined, the apparatus produces droplets at a desired frequency from each of the nozzles 11 with the droplets having substantially uniform size and substantially the same break-off point. This is because the arcuate sector 20 produces only symmetrical vibrations at the selected resonant frequency within the ink in the ink cavity 25 along the portion of its length opposite which the nozzles 11 are disposed.

Figure 3:
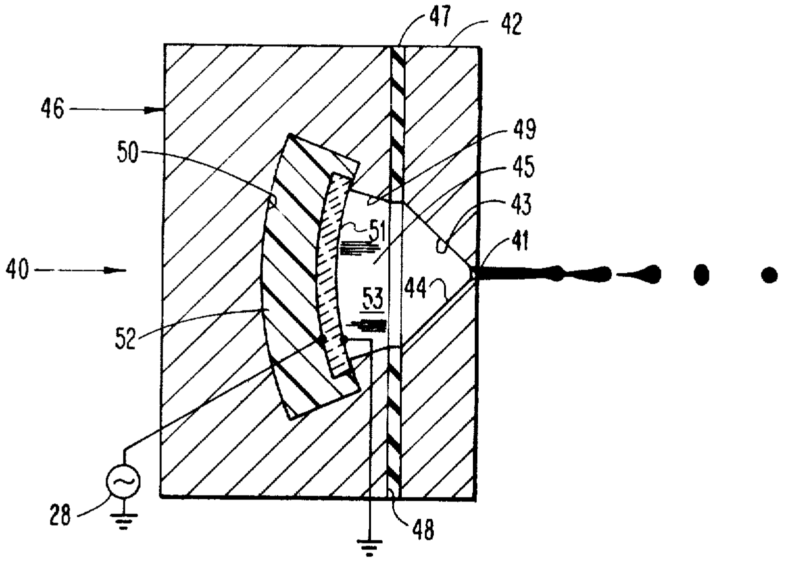
FIG. 3 is a sectional view of another modification of the apparatus of the present invention.

Referring to FIG. 3, there is shown another form of the present invention in which an ink jet head 40 has a linear array of nozzles 41 formed in a nozzle mounting plate 42. While the nozzles 41 are arranged in the same manner as the nozzles 11 in the plate 12 in FIG. 1, the nozzles 41 are mounted in the mounting plate 42 rather than in a separate plate attached to the mounting plate as in FIG. 1.

The mounting plate 42 has inclined walls or surfaces 43 and 44 formed therein in the same manner as shown in FIG. 2 for the mounting plate 14. The inclined walls 43 and 44 function for the same purpose as the inclined walls 33 and 34 in the mounting plate 14 of FIG. 2.

The ink jet head 40 has a pair of end walls or caps (one shown at 45). A housing 46, which has a gasket 47 disposed between a wall 48 of the housing 46 and a surface of the mounting plate 42, supports the mounting plate 42 and the gasket 47. It should be understood that each of the end walls or caps (one shown at 45) extends for the thickness and width of the housing 46 and abuts the gasket 47.

The housing 46 has a first arcuate slot 49 formed in the wall 48 and a second arcuate slot 50, which is larger than the first arcuate slot 49, communicating with the first arcuate slot 49. An arcuate sector 51 of a piezoelectric material is mounted within the second arcuate slot 50 and retained therein by an elastic foundation 52 such as an epoxy, for example. The epoxy, which forms the elastic foundation 52, must be capable of isolating the arcuate sector 51 from the housing 46.

An ink cavity 53 is formed between the end walls (one shown at 45), the mounting plate 42, the housing 46, and the gasket 47. The arcuate sector 51 forms one of the walls of the ink cavity 53. Because of the elastic foundation 52, all vibrations from the arcuate sector 51 are transmitted to the ink within the ink cavity 53. The ink is supplied to the ink cavity 53 in the same manner as described for FIG. 1 but is not shown in the ink cavity 53 for clarity purposes.

The arcuate sector 51 is shown as having an arcuate angle less than 180°. As previously mentioned with respect to FIG. 1, the arcuate section 51 may have any arcuate angle but is preferably no greater than 180°. The arcuate angle, the mean radius, and the wall thickness of the arcuate sector 51 determine the resonant frequency of the arcuate sector 51.

In this embodiment, the gasket 47 has no contact with the arcuate sector 51. Accordingly, the gasket 47 has no effect on the resonant frequency produced by the arcuate sector 51.

The method for forming the apparatus of FIG. 3 and the operation thereof is the same as that described for FIGS. 1 and 2. The only difference is that the gasket 47 does not have any effect on the resonant frequency of the arcuate sector 51 so that it cannot be utilized to fine tune the resonant frequency.

Figure 4:
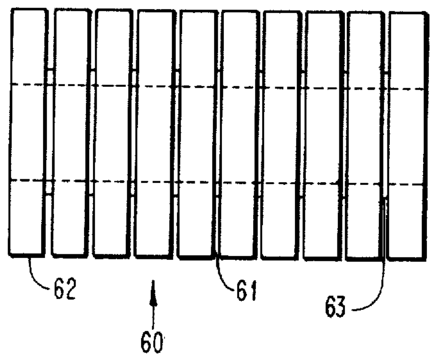
FIG. 4 is a side elevational view of a further embodiment of the transducer of the present invention.
Figure 5:
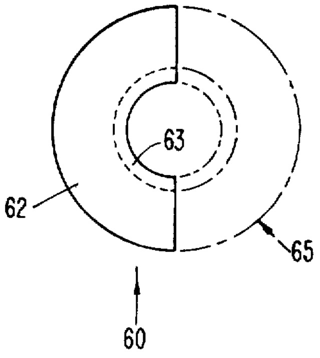
FIG. 5 is an end elevational view of the transducer of FIG. 4.

Referring to FIGS. 4 and 5, there is shown an arcuate sector 60 of a piezoelectric material. The arcuate sector 60 has slots 61 extending inwardly from the periphery of the arcuate sector 60 for a predetermined radial distance. The slots 61 are of the same thickness and spaced equally from each other along the length of the arcuate sector 60 to form a plurality of arcuate segments 62 of equal length. The arcuate sector 60 has a thin central connecting portion 63, which joins the segments 62 to each other by being integral therewith. The slots 61 are filled with epoxy (not shown) to support the segments 62 and isolate them from each other so as to dampen any mechanical couplings therebetween.

The use of the slots 61 results in the arcuate sector 60 having the resonant frequencies of the vibrating modes other than the resonant frequency of the symmetrical mode shifted to very high ranges because of the relatively short length of each of the segments 62. This prevents any undesired resonant frequencies from interfering with the desired resonant frequency of the arcuate sector 60.

The arcuate sector 60 is formed by initially forming the slots 61 in a cylinder 65 (see FIG. 5). Then, the epoxy is disposed in the slots 61 to provide structural support for the segments 62. Thereafter, the cylinder 65 is cut to form the arcuate sector 60 of the desired arcuate angle with the remainder of the cylinder 65 being in phantom.

The arcuate sector 60 may be employed with the apparatus of FIG. 1 or FIG. 3, for example. When using the arcuate sector 60, it is necessary to apply the AC source 28 simultaneously to each of the arcuate segments 62; otherwise, the remainder of the operation of the apparatus of FIG. 1 or FIG. 3 would be the same as previously described.

Figure 6:
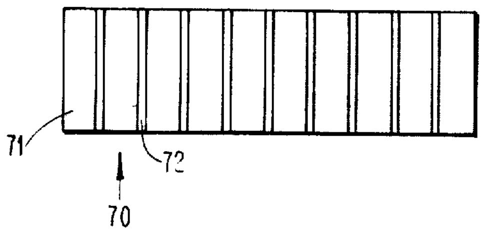
FIG. 6 is a side elevational view of still another modification of the transducer of the present invention.
Figure 7:
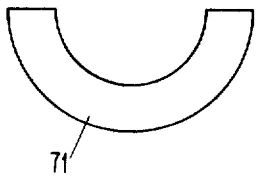
FIG. 7 is an end elevational view of the transducer of FIG. 6.

Referring to FIGS. 6 and 7, there is shown an arcuate sector 70, which can be used in the apparatus of FIG. 1 or FIG. 3. The arcuate sector 70 is formed of a plurality of separate segments 71 of equal length. The arcuate segments 71 are joined to each other only by epoxy 72. Thus, the epoxy 72 isolates the segments 71 from each other to dampen any mechanical couplings therebetween while connecting them to each other. This insures that all of the non-symmetrical vibrating frequencies of each of the segments 71 are above the selected resonant frequency at which the vibration mode is symmetrical.

As in the modification of FIGS. 4 and 5, it is necessary for each of the segments 71 to have the AC source 28 connected thereto in the same manner as the AC source 28 is connected to the arcuate sector 20 in FIG. 1. Thus, the AC source 28 could be connected in parallel to each of the segments 71 of the arcuate sector 70.

Figure 8:
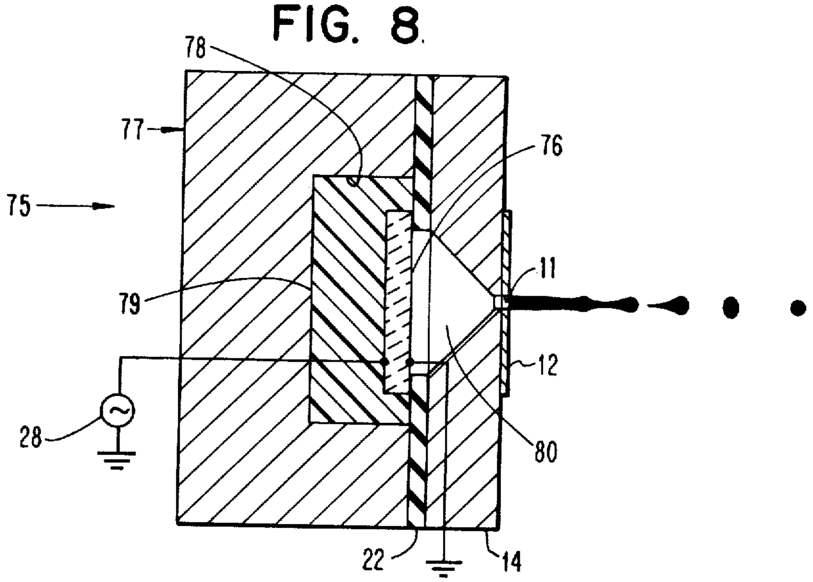
FIG. 8 is a sectional view of yet another modification of the apparatus of the present invention.

Referring to FIG. 8, there is shown another embodiment of the present invention in which an ink jet head 75 has a rectangular shaped element 76 of a piezoelectric material utilized with the mounting plate 14 and the nozzle plate 12 of FIG. 2. The gasket 22 of FIG. 2 also is employed.

Because of the rectangular shaped element 76 having a rectangular shaped cross section, a housing 77 is employed instead of the housing 17 of FIG. 2. The housing 77 has a rectangular shaped slot 78 therein to receive the rectangular shaped element 76. An elastic foundation 79 of epoxy is employed in the same manner as the elastic foundation 21 of FIG. 2.

While the epoxy preferably extends for the entire length of the slot 78, it should be understood that such is not necessary for satisfactory operation. It is only necessary that the epoxy be disposed at each end of the rectangular shaped element 76 within the slot 78 so as to isolate the rectangular shaped element 76 from the housing 77 in the same manner as discussed with respect to FIG. 2.

As opposed to the showing of FIG. 2, the thickness of the gasket 22 has little effect upon the resonant frequency of the rectangular shaped element 76. This is because the top and bottom surfaces of the element 76 do not abut the gasket 22 as do the free lateral surfaces 23 and 24 of the arcuate sector 20 in FIG. 2. The elastic foundation 79 of epoxy abuts the ends of the element 76 in FIG. 8. The characteristics of the epoxy will affect the resonant frequency, but these characteristics are not tunable in the same way as the thickness of gasket 22 in FIG. 2. Rather, the resonant frequency of the rectangular shaped element 76 can be altered by changing both of its cross sectional dimensions with the longer of the two cross sectional dimensions primarily controlling the resonant frequency.

The rectangular shaped element 76, the nozzle mounting plate 14, and the gasket 22 cooperate to form an ink cavity 80 therebetween in the same manner as the ink cavity 25 is formed in the embodiment of FIG. 2.

Ink is supplied under pressure to the ink cavity 80 in the same manner as described with respect to FIGS. 1 and 2.

Because of the elastic foundation 79, all vibrations from the rectangular shaped element 76 are transmitted to the ink in the ink cavity 80. The ink cavity 80 is completely filled with ink under pressure although the ink is not shown in the ink cavity 80 for clarity purposes.

Figure 9:
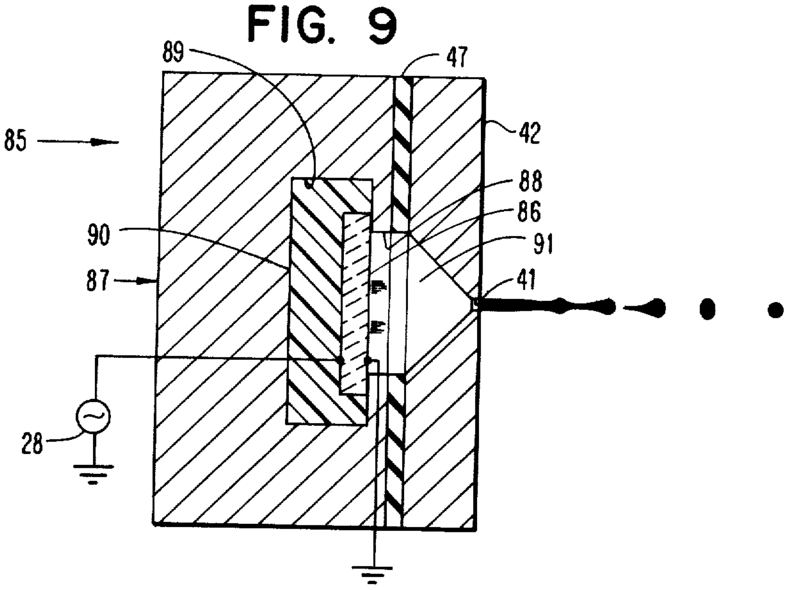
FIG. 9 is a sectional view of a still further embodiment of the apparatus of the present invention.

Referring to FIG. 9, there is shown still another form of the present invention in which an ink jet head 85 is formed in a manner similar to that of FIG. 3. Thus, the ink jet head 85 includes the linear array of nozzles 41 formed in the nozzle mounting plate 42 and the gasket 47.

However, a rectangular shaped element 86 of a piezoelectric material is used in FIG. 9 instead of the arcuate sector 51 of FIG. 3. The rectangular shaped element 86 necessitates a housing 87 of a different configuration than the housing 46 of FIG. 3. Thus, the housing 87 has a first rectangular shaped slot 88 formed therein and a second rectangular slot 89, which is larger than the first slot 88, communicating with the first slot 88.

The rectangular shaped element 86 is mounted in the second slot 89 and retained therein by an elastic foundation 90 such as an epoxy, for example. In the same manner as described for FIG. 3, the epoxy, which forms the elastic foundation 90, must be capable of isolating the rectangular shaped element 86 from the housing 87.

An ink cavity 91 is formed between the end walls 45, the mounting plate 42, the housing 87, and the gasket 47 in a manner similar to that shown and described for the embodiment of FIG. 3. The rectangular shaped element 86 forms one of the walls of the ink cavity 91. Because of the elastic foundation 90, all vibrations from the rectangular shaped element 86 are transmitted to the ink within the ink cavity 91. The ink is supplied to the ink cavity 91 in the same manner as described for FIGS. 1 and 2 although the ink is not shown in the ink cavity 91 for clarity purposes.

The method for forming the apparatus of FIG. 9 and the operation thereof is the same as that described for FIGS. 1 and 2. The only difference is that the gasket 47 does not have any effect on the resonant frequency of the rectangular shaped element 86 so that it cannot be utilized to fine tune the resonant frequency.

Figure 10:
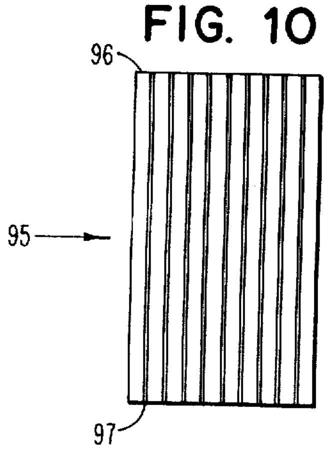
FIG. 10 is a side elevational view of yet another modification of the transducer of the present invention.
Figure 11:
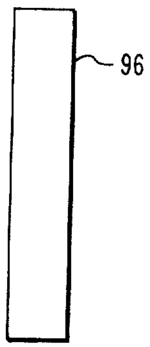
FIG. 11 is an end elevational view of the transducer of FIG. 10.

Referring to FIGS. 10 and 11, there is shown a rectangular shaped element 95, which can be used in the apparatus of FIG. 8 or FIG. 9. The rectangular shaped element 95 is formed of a plurality of separate segments 96 of equal length. The segments 96 are joined to each other only by an epoxy 97. Thus, the epoxy 97 isolates the segments 96 from each other to dampen any mechanical couplings therebetween while connecting them to each other. This insures that all the non-symmetrical vibrating frequencies of each of the segments 96 are above the selected resonant frequency at which the vibration mode is symmetrical.

As in the modifications of FIGS. 4 and 5 and FIGS. 6 and 7, it is necessary for each of the segments 96 to have the AC source connected thereto in the same manner as the AC source 28 is connected to the arcuate sector 20 in FIG. 1. Thus, the AC source 28 could be connected in parallel to each of the segments 96 of the rectangular shaped element 95.

While the present invention has shown and described the piezoelectric transducers as being arcuate sectors or rectangular shaped elements, it should be understood that such is not a requisite for operation of the present invention. It is only necessary that the geometry of the element be capable of being selected to produce the desired resonant frequency so that vibrations at the desired resonant frequency are symmetrical with respect to the linear array of the ink jet nozzles and that no non-symmetrical vibrations are produced when the voltage at the selected resonant frequency is applied to the element.

While the present invention has shown and described the piezoelectric transducer as forming a wall of the ink cavity, it should be understood that such is not necessary for operation. A very thin member could be employed as the wall of the ink cavity and have the transducer engaging thereagainst. This thin member would have to have a relatively small mass in comparison with the mass of the transducer so as not to modify the vibrations produced from the transducer when it is vibrating at the selected resonant frequency.

It should be understood that any suitable piezoelectric material may be employed. One example is a piezoelectric material sold in a cylindrical shell as PZT-4 by Vernitron Company.

Any suitable epoxy may be employed for isolating the piezoelectric transducer from the housing and for connecting the arcuate segments of the arcuate sector to each other. The epoxy layer must be such that it is of high acoustic wave impedance to isolate the housing from the transducer vibrations. One suitable example of the epoxy is sold by Adhesive Engineering Company, San Carlos, Calif. as "Glasshesive 2060."

When the arcuate sector is formed of a single element of one inch in length, tests have indicated that the center six-tenths of an inch in length of the arcuate sector produces symmetrical vibrations at a selected resonant frequency. The linear array of nozzles must be aligned with this portion of the transducer.

When a one inch long arcuate sector is formed of a plurality of ten segments, tests have indicated that the center nine-tenths of an inch of the length of the arcuate sector has symmetrical vibrations at the selected resonant frequency. Thus, a substantial increase in the length along which the vibrations are symmetrical is obtained when the arcuate sector is formed of a plurality of arcuate segments since the nozzles can now be aligned with ninety percent of the one inch length of the arcuate sector so that only five percent of the length of the sector at each end does not have symmetrical vibrations at the selected resonant frequency.

An advantage of this invention is that the driver vibrations are symmetrical along the portion of the transducer opposite the array of nozzles. Another advantage of this invention is that driver end conditions of an ink cavity are avoided. A further advantage of this invention is that satellite free droplets are produced from a plurality of ink streams by a single driver.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for simultaneously exciting a plurality of pressurized ink streams to produce substantially uniform droplets in each stream including:

a plurality of ink jet nozzles;

means to mount said ink jet nozzles in a linear array so that their axes are substantially parallel to each other;

means cooperating with said mounting means to form an ink supply cavity for said ink jet nozzles;

and an element of piezoelectric material having a geometry that causes said element to vibrate only in a selected symmetrical mode at a selected resonant frequency when a voltage at the selected resonant frequency is applied, said element being disposed adjacent said cavity to periodically produce pressure waves in the ink within said cavity when said element vibrates at the selected resonant frequency in the selected symmetrical mode with the amplitude of each pressure wave being substantially uniform at the entrance of each of said ink jet nozzles to simultaneously excite the ink stream in each of said ink jet nozzles periodically to produce the ink droplets from each of the streams with the ink droplets of each of the steams being of substantially uniform size and each of the streams having substantially the same break-off point.

2. The apparatus according to claim 1 in which said mounting means includes a substantially planar wall, the side of said wall of said mounting means in communication with said cavity has inclined surfaces on opposite sides of a line connecting the axes of said ink jet nozzles to direct each of the periodic pressure waves toward said ink jet nozzles.

3. The apparatus according to claim 2 in which:

said element of piezoelectric material has a length greater than the length of the linear array of said ink jet nozzles;

means applies a voltage of a selected magnitude at the selected resonant frequency to said element to cause vibration only in the selected symmetrical mode of said element at the selected resonant frequency, the selected magnitude of the voltage being strong enough to produce satellite free droplets;

and said element is disposed relative to the linear array of said ink jet nozzles so that the amplitude of each of the periodic pressure waves applies to the ink streams in said ink jet nozzles by said element vibrating at the selected resonant frequency is substantially uniform at the entrance to each of said ink jet nozzles.

4. The apparatus according to claim 3 in which said element constitutes a boundary wall of said ink cavity with said boundary wall contacted by ink in said ink cavity and said element is disposed opposite the entrance to each of said ink jet nozzles.

5. An apparatus for simultaneously exciting a plurality of pressurized ink streams to produce substantially uniform droplets in each stream including:

a plurality of ink jet nozzles;

means to mount said ink jet nozzles in a linear array so that their axes are substantially parallel to each other;

means cooperating with said mounting means to form an ink supply cavity for said ink jet nozzles;

an arcuate sector of a cylinder of a piezoelectric material having its mean radius, its wall thickness, and its arcuate angle selected so that said arcuate sector vibrates only in a selected symmetrical mode at a selected resonant frequency when a voltage at the selected resonant frequency is applied, said arcuate being disposed adjacent said cavity to periodically produce pressure waves in the ink within said cavity when said arcuate sector vibrates at the selected resonant frequency in the selected symmetrical mode with the amplitude of each pressure wave being substantially uniform at the entrance to each of said ink jet nozzles to simultaneously excite the ink stream in each of said ink jet nozzles periodically to produce the ink droplets from each of the streams with the ink droplets of each of the streams being of substantially uniform size and each of the streams having substantially the same break-off point;

said mounting means including a substantially planar wall, the side of said wall of said mounting means in communication with said cavity having inclined surfaces on opposite sides of a line connecting the axes of said ink jet nozzles to direct each of the periodic pressure waves toward said ink jet nozzles;

said arcuate sector having a length greater than the length of the linear array of said ink jet nozzles;

means to apply a voltage of a selected magnitude at the selected resonant frequency to said arcuate sector to cause vibrations only in the selected symmetrical mode of said arcuate sector at the selected resonant frequency, the selected magnitude of the voltage being strong enough to produce satellite free droplets;

said arcuate sector being disposed relative to the linear array of said ink jet nozzles so that the amplitude of each of the periodic pressure waves applied to the ink streams in said ink jet nozzles by said arcuate sector vibrating at the selected resonant frequency is substantially uniform at the entrance to each of said ink jet nozzles;

and said arcuate sector constituting a boundary wall of said ink cavity with said boundary wall contacted by ink in said ink cavity and said arcuate sector being disposed opposite the entrance to each of said ink jet nozzles.

6. The apparatus according to claim 5 including:

a housing supporting said arcuate sector;

and means to isolate said arcuate sector from said housing to isolate all vibrations of said arcuate sector from said housing.

7. The apparatus according to claim 6 in which said isolating means includes epoxy disposed at least adjacent each of the ends of said arcuate sector.

8. The apparatus according to claim 6 in which:

said arcuate sector comprises a plurality of arcuate segments of substantially equal length;

and means connects said arcuate segments of said arcuate sector to each other.

9. The apparatus according to claim 8 in which said arcuate sector has a plurality of substantially equally spaced continuous slots extending inwardly from its periphery to a predetermined radius to form said arcuate segments and said connected means includes the portion of said arcuate sector having the predetermined radius.

10. The apparatus according to claim 5 including said arcuate sector having a pair of free surfaces, flexible means disposed between each of said free surfaces of said arcuate sector and said wall of said mounting means to form a seal therebetween, and said flexible means having its thickness selected to fine tune the selected resonant frequency of said arcuate sector.

11. The apparatus according to claim 4 in which said element of piezoelectric material is a rectangular shaped element of a piezoelectric material and said rectangular shaped element has its cross sectional length and width selected so that said rectangular shaped element vibrates only in the selected symmetrical mode at the selected resonant frequency.

12. The apparatus according to claim 11 including:
a housing supporting said rectangular shaped element;
and means to isolate said rectangular shaped element from said housing.

13. The apparatus according to claim 12 in which said isolating means includes epoxy disposed at least adjacent each of the ends of said rectangular shaped element.

14. The apparatus according to claim 12 in which:
said rectangular shaped element comprises a plurality of rectangular shaped segments of substantially equal length;
and means connects said segments of said rectangular shaped element to each other.

15. An apparatus for simultaneously exciting a plurality of pressurized ink streams to produce substantially uniform droplets in each stream including:
a plurality of ink jet nozzles;
means to mount said ink jet nozzles in a linear array so that their axes are substantially parallel to each other;
means cooperating with said mounting means to form an ink supply cavity for said ink jet nozzles;
an arcuate sector of a cylinder of a piezoelectric material having its mean radius, its wall thickness, and its arcuate angle selected so that said arcuate sector vibrates only in a selected symmetrical mode at a selected resonant frequency when a voltage at the selected resonant frequency is applied, said arcuate sector being disposed adjacent said cavity to periodically produce pressure waves in the ink within said cavity when said arcuate sector vibrates at the selected resonant frequency in the selected symmetrical mode with the amplitude of each pressure wave being substantially uniform at the entrance to each of said ink jet nozzles to simultaneously excite the ink stream in each of said ink jet nozzles periodically to produce the ink droplets from each of the streams with the ink droplets of each of the streams being of substantially uniform size and each of the streams having substantially the same break-off point;
said mounting means including a substantially planar wall, the side of said wall of said mounting means in communication with said cavity having inclined surfaces on opposite sides of a line connecting the axes of said ink jet nozzles to direct each of the periodic pressure waves toward said ink jet nozzles;
said arcuate sector having a length greater than the length of the linear array of said ink jet nozzles;
means to apply a voltage of a selected magnitude at the selected resonant frequency to said arcuate sector to cause vibrations only in the selected symmetrical mode of said element at the selected resonant frequency, the selected magnitude of the voltage being strong enough to produce satellite free droplets;
and said arcuate sector being disposed relative to the linear array of said ink jet nozzles so that the amplitude of each of the periodic pressure waves applied to the ink streams in said ink jet nozzles by said arcuate sector vibrating at the selected resonant frequency is substantially uniform at the entrance to each of said ink jet nozzles.

16. The apparatus according to claim 15 including:
a housing supporting said arcuate sector;
and means to isolate said arcuate sector from said housing to isolate all vibrations of said arcuate sector from said housing.

17. The apparatus according to claim 16 in which said isolating means includes epoxy disposed at least adjacent each of the ends of said arcuate sector.

18. The apparatus according to claim 16 in which:
said arcuate sector comprises a plurality of arcuate segments of substantially equal length;
and means connects said arcuate segments of said arcuate sector to each other.

19. The apparatus according to claim 18 in which said arcuate sector has a plurality of substantially equally spaced continuous slots extending inwardly from its periphery to a predetermined radius to form said arcuate segments and said connected means includes the portion of said arcuate sector having the predetermined radius.

20. The apparatus according to claim 15 including said arcuate sector having a pair of free surfaces, flexible means disposed between each of said free surfaces of said arcuate sector and said wall of said mounting means to form a seal therebetween, and said flexible means having its thickness selected to fine tune the selected resonant frequency of said arcuate sector.

21. The apparatus according to claim 3 in which said element of piezoelectric material is a rectangular shaped element of a piezoelectric material and said rectangular shaped element has its cross sectional length and width selected so that said rectangular shaped element vibrates only in the selected symmetrical mode at the selected resonant frequency.

22. The apparatus according to claim 21 including:
a housing supporting said rectangular shaped element;
and means to isolate said rectangular shaped element from said housing.

23. The apparatus according to claim 22 in which said isolating means includes epoxy disposed at least adjacent each of the ends of said rectangular shaped element.

24. The apparatus according to claim 22 in which:
said rectangular shaped element comprises a plurality of rectangular shaped segments of substantially equal length;
and means connects said segments of said rectangular shaped element to each other.

25. An apparatus for simultaneously exciting a plurality of pressurized ink streams to produce substantially uniform droplets in each stream including:
a plurality of ink jet nozzles;
means to mount said ink jet nozzles in a linear array;
means cooperating with said mounting means to form an ink supply cavity for said ink jet nozzles;
and an element of piezoelectric material having a geometry that causes said element to vibrate only in a selected symmetrical mode at a selected resonant frequency when a voltage at the selected resonant frequency is applied, said element being disposed adjacent said cavity to periodically produce pressure waves in the ink within said cavity when said element vibrates at the selected resonant frequency in the selected symmetrical mode with the amplitude of each pressure wave being substantially uniform at the entrance to each of said ink jet nozzles to simultaneously excite the ink stream in each of said ink jet nozzles periodically to produce the ink droplets from each of the streams with the ink droplets of each of the streams being of substantially uniform size and each of the streams having substantially the same break-off point.

26. The apparatus according to claim 25 in which said element constitutes a boundary wall of said ink cavity with said boundary wall contacted by ink in said ink cavity, said element is disposed opposite the entrance to each of said ink jet nozzles, and said element is disposed relative to the linear array of said ink jet nozzles so that the amplitude of each of the periodic pressure waves applied to the ink streams in said ink jet nozzles by said element vibrating at the selected resonant frequency is substantially uniform at the entrance to each of said ink jet nozzles.

27. An apparatus for simultaneously exciting a plurality of pressurized ink streams to produce substantially uniform droplets in each stream including:

a plurality of ink jet nozzles;

means to mount said ink jet nozzles in a linear array;

means cooperating with said mounting means to form an ink supply cavity for said ink jet nozzles;

an arcuate sector of a cylinder of a piezoelectric material having its mean radius, its wall thickness, and its arcuate angle selected so that said arcuate sector vibrates only in a selected symmetrical mode at a selected resonant frequency when a voltage at the selected resonant frequency is applied, said arcuate sector being disposed adjacent said cavity to periodically produce pressure waves in the ink within said cavity when said arcuate sector vibrates at the selected resonant frequency in the selected symmetrical mode with the amplitude of each pressure wave being substantially uniform at the entrance to each of said ink jet nozzles to simultaneously excite the ink stream in each of said ink jet nozzles periodically to produce the ink droplets from each of the streams with the ink droplets of each of the streams being of substantially uniform size and each of the streams having substantially the same break-off point;

and said arcuate sector constituting a boundary wall of said ink cavity with said boundary wall contacted by ink in said ink cavity, said arcuate sector being disposed opposite the entrance to each of said ink jet nozzles, said arcuate sector being disposed relative to the linear array of said ink jet nozzles so that the amplitude of each of the periodic pressure waves applied to the ink streams in said ink jet nozzles by said arcuate sector vibrating at the selected resonant frequency is substantially uniform at the entrance to each of said ink jet nozzles.

28. The apparatus according to claim 27 including:

a housing supporting said arcuate sector;

and means to isolate said arcuate sector from said housing to isolate all vibrations of said arcuate sector from said housing.

29. The apparatus according to claim 28 in which said isolating means includes epoxy disposed at least adjacent each of the ends of said arcuate sector.

30. The apparatus according to claim 28 in which:

said arcuate sector comprises a plurality of arcuate segments;

and means connects said arcuate segments of said arcuate sector to each other.

31. The apparatus according to claim 30 in which said arcuate sector has a plurality of spaced continuous slots extending inwardly from its periphery to a predetermined radius to form said arcuate segments and said connected means includes the portion of said arcuate sector having the predetermined radius.

32. The apparatus according to claim 26 in which said element of piezoelectric material is a rectangular shaped element of a piezoelectric material and said rectangular shaped element has its cross sectional length and width selected so that said rectangular shaped element vibrates only in the selected symmetrical mode at the selected resonant frequency.

33. The apparatus according to claim 32 including:

a housing supporting said rectangular shaped element;

and means to isolate said rectangular shaped element from said housing.

34. The apparatus according to claim 33 in which said isolating means includes epoxy disposed at least adjacent each of the ends of said rectangular shaped element.

35. The apparatus according to claim 33 in which:

said rectangular shaped element comprises a plurality of rectangular shaped elements;

and means connects said segments of said rectangular shaped element to each other.

36. An apparatus for simultaneously exciting a plurality of pressurized ink streams to produce substantially uniform droplets in each stream including:

a plurality of ink jet nozzles;

means to mount said ink jet nozzles in a linear array;

means cooperating with said mounting means to form an ink supply cavity for said ink jet nozzles;

and an arcuate sector of a cylinder of a piezoelectric material having its mean radius, its wall thickness, and its arcuate angle selected so that said arcuate sector vibrates only in a selected symmetrical mode at a selected resonant frequency when a voltage at the selected resonant frequency is applied, said arcuate sector being disposed adjacent said cavity to periodically produce pressure waves in the ink within said cavity when said arcuate sector vibrates at the selected resonant frequency in the selected symmetrical mode with the amplitude of each pressure wave being substantially uniform at the entrance to each of said ink jet nozzles to simultaneously excite the ink stream in each of said ink jet nozzles periodically to produce the ink droplets from each of the streams with the ink droplets of each of the streams being of substantially uniform size and each of the streams having substantially the same break-off point.

37. The apparatus according to claim 36 including:

a housing supporting said arcuate sector;

and means to isolate said arcuate sector from said housing to isolate all vibrations of said arcuate sector from said housing.

38. The apparatus according to claim 37 in which said isolating means includes epoxy disposed at least adjacent each of the ends of said arcuate sector.

39. The apparatus according to claim 37 in which:

said arcuate sector comprises a plurality of arcuate segments;

and means connects said arcuate segments of said arcuate sector to each other.

40. The apparatus according to claim 39 in which said arcuate sector has a plurality of spaced continuous slots extending inwardly from its periphery to a predetermined radius to form said arcuate segments and said connected means includes the portion of said arcuate sector having the predetermined radius.

41. The apparatus according to claim 25 in which said element of piezoelectric material is a rectangular shaped element of a piezoelectric material and said rectangular shaped element has its cross sectional length and width selected so that said rectangular shaped element vibrates only in the selected symmetrical mode at the selected resonant frequency.

42. The apparatus according to claim 41 including:

a housing supporting said rectangular shaped element;

and means to isolate said rectangular shaped element from said housing.

43. The apparatus according to claim 42 in which said isolating means includes epoxy disposed at least adjacent each of the ends of said rectangular shaped element.

44. The apparatus according to claim 42 in which:

said rectangular shaped element comprises a plurality of rectangular shaped segments;

and means connects said segments of said rectangular shaped element to each other.

45. A method of forming an apparatus for simultaneously exciting a plurality of pressurized ink streams to produce substantially uniform droplets in each stream including:

disposing a plurality of ink jet nozzles in a linear array and in communication with an ink supply cavity;

selecting the geometry of an element of piezoelectric material so that it vibrates only in a selected symmetrical mode at a selected resonant frequency, when a voltage is applied at the selected resonant frequency to the element, to produce periodic pressure waves in the ink cavity with the amplitude of each pressure wave being substantially uniform at the entrance to each of the ink jet nozzles to form the ink droplets of each of the streams of substantially uniform size with each of the streams having substantially the same break-off point;

and disposing the element adjacent the ink cavity so that it produces the periodic pressure waves in the ink cavity when the voltage at the selected resonant frequency is applied to the element to cause vibration of the element only in the selected symmetrical mode at the selected resonant frequency.

46. The method according to claim 45 including disposing the element as a boundary wall of the ink cavity for contact with ink in the ink cavity and opposite the entrances to the ink jet nozzles.

47. A method of forming an apparatus for simultaneously exciting a plurality of pressurized ink streams to produce substantially uniform droplets in each stream including:

disposing a plurality of ink jet nozzles in a linear array and in communication with an ink supply cavity;

selecting the mean radius, the wall thickness, and the arcuate angle of an arcuate sector of a cylinder of piezoelectric material so that the arcuate sector vibrates only in a selected symmetrical mode at a selected resonant frequency, when a voltage is applied at the selected resonant frequency to the arcuate sector, to produce periodic pressure waves in the ink cavity with the amplitude of each pressure wave being substantially uniform at the entrance to each of the ink jet nozzles to form the ink droplets of each of the streams of substantially uniform size with each of the streams having substantially the same break-off point;

disposing the arcuate sector adjacent the ink cavity so that it produces the periodic pressure waves in the ink cavity when the voltage at the selected resonant frequency is applied to the arcuate sector to cause vibration of the arcuate sector only in the selected symmetrical mode at the selected resonant frequency;

and disposing the arcuate sector as a boundary wall of the ink cavity for contact with ink in the ink cavity and opposite the entrances to the ink jet nozzles.

48. The method according to claim 47 including:

forming the length of the arcuate sector of a plurality of arcuate segments;

and connecting the arcuate segments to each other solely by epoxy.

49. The method according to claim 47 including:

forming slots in the cylinder from which the arcuate sector is to be formed with the slots extending inwardly to a predetermined radius of the cylinder;

forming the slots so that a plurality of arcuate segments are produced and connected to each other by the portion of the cylinder having the predetermined radius;

disposing supporting material for the segments within the slots;

and forming the arcuate sector by removing the remainder of the cylinder.

50. The method according to claim 46 in which the element is a rectangular shaped element and selecting the cross sectional length and width of the rectangular shaped element so that the rectangular shaped element vibrates only in the selected symmetrical mode at the selected resonant frequency when the voltage is applied at the selected resonant frequency.

51. The method according to claim 50 including:

forming the length of the rectangular shaped element of a plurality of rectangular shaped segments;

and connecting the rectangular shaped segments to each other by epoxy.

52. A method of forming an apparatus for simultaneously exciting a plurality of pressurized ink streams to produce substantially uniform droplets in each stream including:

disposing a plurality of ink jet nozzles in a linear array and in communication with an ink supply cavity;

selecting the mean radius, the wall thickness, and the arcuate angle of an arcuate sector of a cylinder of piezoelectric material so that the arcuate sector vibrates only in a selected symmetrical mode at a selected resonant frequency, when a voltage is applied at the selected resonant frequency to the arcuate sector, to produce periodic pressure waves in the ink cavity with the amplitude of each pressure wave being substantially uniform at the entrance to each of the ink jet nozzles to form the ink droplets of each of the streams of substantially uniform size with each of the streams having substantially the same break-off point;

and disposing the arcuate sector adjacent the ink cavity so that it produces the periodic pressure waves in the ink cavity when the voltage at the selected resonant frequency is applied to the arcuate sector to cause vibration of the arcuate sector only in the selected symmetrical mode at the selected resonant frequency.

53. The method according to claim 52 including:
forming the length of the arcuate sector of a plurality of arcuate segments;
and connecting the arcuate segments to each other solely by epoxy.

54. The method according to claim 52 including:
forming slots in the cylinder from which the arcuate sector is to be formed with the slots extending inwardly to a predetermined radius of the cylinder;
forming the slots so that a plurality of arcuate segments are produced and connected to each other by the portion of the cylinder having the predetermined radius;
disposing supporting material for the segments within the slots;
and forming the arcuate sector by removing the remainder of the cylinder.

55. The method according to claim 45 in which the element is a rectangular shaped element and selecting the cross sectional length and width of the rectangular shaped element so that the rectangular shaped element vibrates only in the selected symmetrical mode at the selected resonant frequency when the voltage is applied at the selected resonant frequency.

56. The method according to claim 55 including:
forming the length of the rectangular shaped element of a plurality of rectangular shaped segments;
and connecting the rectangular shaped segments to each other solely by epoxy.

57. The apparatus according to claim 8 in which said connected means comprises an epoxy providing the sole connection of said arcuate segments of said arcuate sector to each other.

58. The apparatus according to claim 18 in which said connected means comprises an epoxy providing the sole connection of said arcuate segments of said arcuate sector to each other.

59. The apparatus according to claim 30 in which said connected means comprises an epoxy providing the sole connection of said arcuate segments of said arcuate sector to each other.

60. The apparatus according to claim 39 in which said connected means comprises an epoxy providing the sole connection of said arcuate segments of said arcuate sector to each other.

61. The apparatus according to claim 57 in which said isolating means includes epoxy disposed at least adjacent each of the ends of said arcuate sector.

* * * * *